United States Patent [19]

Yasui et al.

[11] Patent Number: 4,760,531
[45] Date of Patent: Jul. 26, 1988

[54] MAP DISPLAY SYSTEM

[75] Inventors: Toshio Yasui, Anjo; Michima Ogawa, Nagoya, both of Japan

[73] Assignee: Nippondenso Co., Ltd., Kariya, Japan

[21] Appl. No.: 862,824

[22] Filed: May 13, 1986

[30] Foreign Application Priority Data

May 16, 1985 [JP] Japan .................. 60-104636

[51] Int. Cl.$^4$ ............................................. G06F 15/50
[52] U.S. Cl. ...................................... 364/443; 364/449; 340/990; 340/995; 73/178 R
[58] Field of Search ............... 364/424, 443, 449, 460, 364/521; 73/178 R; 340/988, 990, 995; 342/450–452

[56] References Cited

U.S. PATENT DOCUMENTS

| | | | |
|---|---|---|---|
| 4,504,913 | 3/1985 | Miura et al. | 364/449 |
| 4,511,973 | 4/1985 | Miura et al. | 364/449 |
| 4,532,514 | 7/1985 | Hatano et al. | 340/995 |
| 4,571,684 | 2/1986 | Takanabe et al. | 340/995 |
| 4,646,089 | 2/1987 | Takanabe et al. | 364/449 |
| 4,675,676 | 6/1987 | Takanabe et al. | 340/995 |

FOREIGN PATENT DOCUMENTS 0118886 9/1984 European Pat. Off. ............ 364/424

Primary Examiner—Gary Chin
Attorney, Agent, or Firm—Cushman, Darby & Cushman

[57] ABSTRACT

A map display system for displaying a linear object on a map in accordance with stored map data is disclosed. The coordinate components of at least two specified points on the linear object and other points thereon crossing straight lines drawn in spaced relationship and in parallel with the straight line connecting the specified points are stored as map data in a memory. The coordinate components thus stored are converted into a display coordinate by a display control to generate a display signal. In accordance with the display signal the linear object is displayed on a display within a predetermined display section.

4 Claims, 9 Drawing Sheets

| (X1,Y1) \ (X2,Y2) | 0 | I | II | III | IV | V | VI | VII | VIII |
|---|---|---|---|---|---|---|---|---|---|
| 0 | × | × | × | × | ○ | ○ | × | ○ | ○ |
| I | × | × | × | ○ | ○ | ○ | ○ | ○ | ○ |
| II | × | × | × | ○ | ○ | × | ○ | ○ | × |
| III | × | ○ | ○ | × | ○ | ○ | × | ○ | ○ |
| IV | ○ | ○ | ○ | ○ | ○ | ○ | ○ | ○ | ○ |
| V | ○ | ○ | × | ○ | ○ | × | ○ | ○ | × |
| VI | × | ○ | ○ | × | ○ | ○ | × | × | × |
| VII | ○ | ○ | ○ | ○ | ○ | ○ | × | × | × |
| VIII | ○ | ○ | × | ○ | ○ | × | × | × | × |

MAP DISPLAY SYSTEM

BACKGROUND OF THE INVENTION

The present invention relates to a map display system, or more particularly to a map display system in which linear display objects on a map such as roads, rivers and railways are stored as a plurality of point data and these point data are connected by straight lines for display on display means such as a CRT display.

There is a conventional map display system in which for the purpose of guiding the vehicle driver or the like, various map data are stored in advance in memory media such as the magnetic tape, optical or magnetic disc or the ROM package, and the required map data is extracted from them for display on a display such as a CRT.

In this type of map display system, the various map data are stored in the memory medium in one of the two methods mentioned below. One method stores a map as a pattern data and displays the map is displayed as is, in accordance with the pattern data. In the other method, linear objects to be displayed such as roads, rivers, railways, coast lines and boundaries of administrative sections are stored as point data individually, and these points are connected to display these objects in a map. In the former method, the map is displayed in accordance with the pattern data stored, and therefore the processing is effected at a rapid rate. Unless pattern data corresponding to respective scales are prepared for enlargement or reduction, however, the map displayed remains at the same level at the time of enlargement or reduction. This leads to the result that even small roads are displayed after reduction and makes the map hard to read. Therefore a detailed and readable map of the particular map cannot be displayed and readable in this enlarged scale. In the case of displaying a map by enlargement or reduction to various scales, therefore, the latter method is often used. In the latter method, as mentioned above, linear objects to be displayed on the map are stored as point data, which are connected to display a given linear object as a map. Once a display level corresponding to the scale is set together with the coordinate representing the position as point data, roads displayed or not displayed may be determined in accordance with the scale at each time of display, so that the map can be easily enlarged or reduced on the one hand, and the map displayed is very easy to read on the other hand.

The latter method divides each linear object to be displayed at regular intervals of distance, and sets point data for each of the dividing points. As a result, even a substantially rectilinear object of display such as main roads or railways contains a multiplicity of point data, thereby requiring a vast amount of point data. Specifically, a straight object of display may be expressed by a straight line connecting the ends thereof. Nevertheless, a multiplicity of point data are unnecessarily set therebetween in the conventional methods. Also, at the time of display of the map, the unrequired point data are read each time for display, thereby taking a long time for map display.

SUMMARY OF THE INVENTION

Accordingly, it is the object of the present invention to provide a map display system in which point data are set for a linear object of display in a way regardless of the length (distance) thereof but in accordance with the shape thereof, so that map data is comprised of only the point data required for display, thus making it possible to display a map within a short time.

DESCRIPTION OF THE PREFERRED EMBODIMENT

Figure 1:
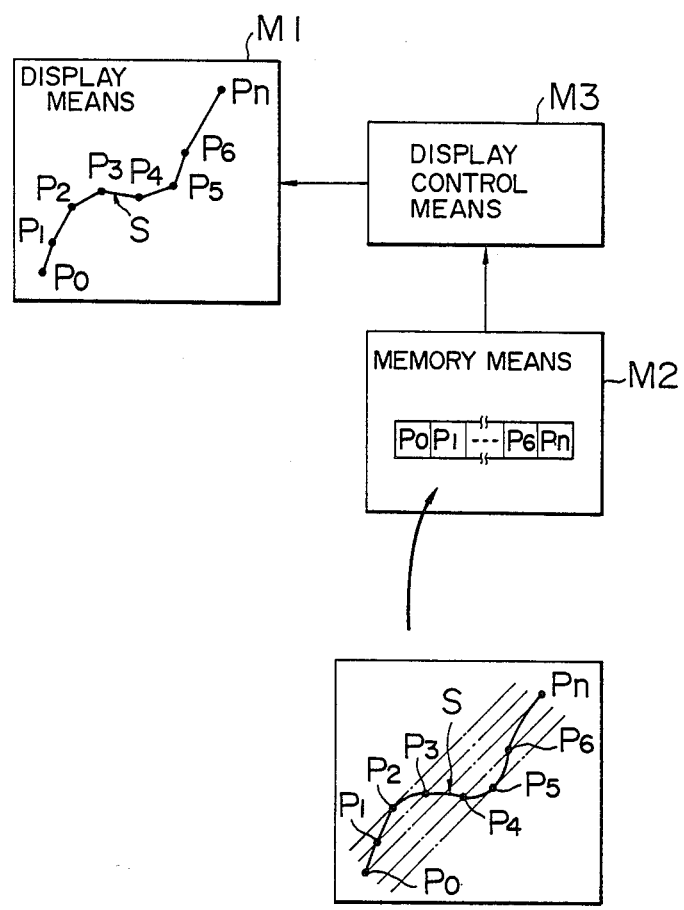
FIG. 1 is a block diagram showing a general configuration of the present invention.

According to the present invention, there is provided a map display system mounted on a vehicle as shown in FIG. 1 comprising display means M1 for displaying a map, memory means M2 for storing a linear object of display S connecting two specified points Po and Pn as a plurality of point data set in accordance with a predetermined coordinate system, and display control means M3 for converting the point data stored in the memory means into a display coordinate system of the display means and connecting the point data with a straight line thereby to display the linear object of display S on the display means M1. The memory means M2 stores the specified points Po and Pn and points P1, P2 and so on along the linear object of display intersecting with straight lines drawn in spaced relationship in parallel with the straight line connecting the specified points Po and Pn as the point data.

The display means M1 is for displaying a map and supplying map information to the vehicle driver or the like, and may be constructed of a CRT, liquid crystal dot display, LED or the like. The memory means M2, on the other hand, is for storing the shapes of a map displayed on the display means, and the names and the like of respective parts on the map as map data, and may be constructed of a magnetic tape, magnetic disc, optical disc, ROM package or the like. Further, the display control means M3 is for displaying a map on the display means M1 by extracting map data required for map display from the memory means M2, and may be constructed of a microcomputer including a CPU, a ROM or a RAM and a drive unit for driving the display means M1.

The memory means M2 stores therein a linear object of display existing between specified points Po and Pn on the map in the form of the specified points Po and Pn and a plurality of point data representing the crossings P1, P2 and so on between the linear object of display and the straight lines drawn in spaced relationship in parallel with the straight line connecting the specified points Po and Pn. When the linear object of display is displayed on the display means M1, the display control means M3 is constructed to display straight lines between the point data. The linear object of display includes a road, a railway, a river or the like object which is displayed as a line on the map. The specified point may be an intersection or the like at which a linear object of display crosses another linear object. The lines parallel to the straight line connecting the specified points may be drawn at intervals of the picture elements with the map displayed on the display means M1 at the minimum scale.

In a map display system according to the present invention having a configuration as mentioned above, the memory means M2 stores a number point data. This number corresponds to the shape of the linear object of display S for each of such object, with fewer point data being stored for a road having many straight parts. In displaying the linear object of display S on the display means M1 by the display control means M3, therefore, a fewer point data are read, thus making it possible to display the map rapidly.

An embodiment of the present invention will be described below with reference to the attached drawings.

Figure 2:
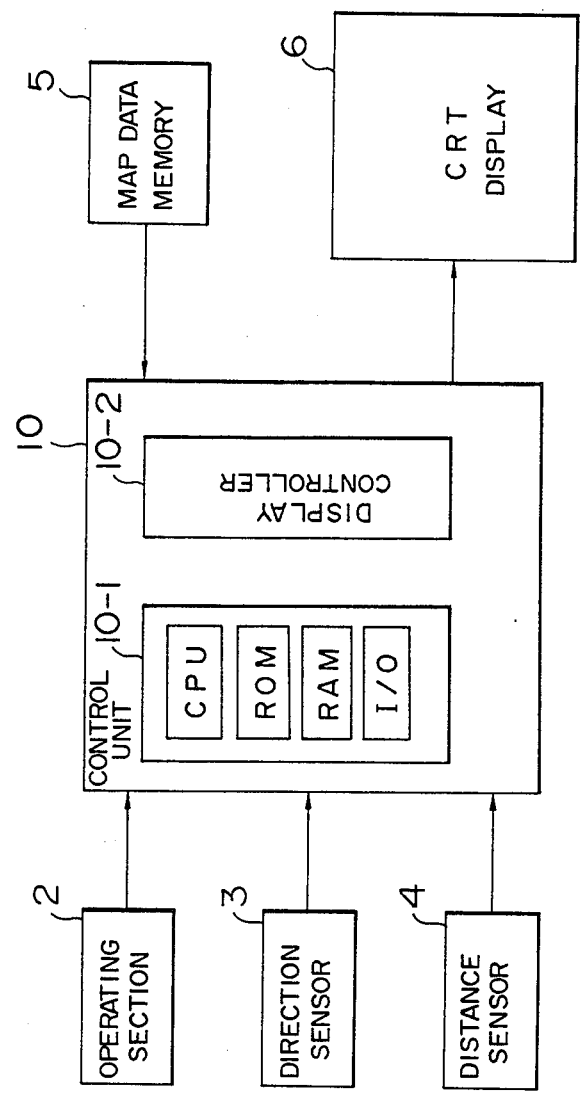
FIG. 2 is a block diagram showing a configuration of an embodiment of the present invention.

A block diagram of a map display system according to the present embodiment is shown in FIG. 2. In FIG. 2, reference numeral 2 designates an operating section operated by the vehicle driver for using the map display system, numeral 3 designates a direction sensor for detecting the direction of driving the vehicle, that is, the direction of the earth magnetism in relation to the vehicle carrying the map display system, numeral 4 a distance sensor for detecting the distance covered by the vehicle, numeral 5 is a map data memory unit corresponding to the memory means M2 for storing the map data for a predetermined area in advance, numeral 6 is a CRT display unit corresponding to the display means M1 for displaying a map, and numeral 10 is a control unit including a microcomputer 10-1 having CPU, a ROM, a RAM and an I/O and a display controller 10-2 for processing the computation and display control for displaying the map on the CRT display 6.

The operating section 2 includes a selection key for selecting an area to be displayed, an enlargement key for giving an instruction for the map on display to be enlarged by one rank, and a reduction key for reducing the size of the map on display by one rank.

The direction sensor 3, on the other hand, includes an annular permalloy core, an excitation coil and two coil arranged at right angles to each other. In response to an output voltage of the two coils, a direction signal for detecting the direction of driving of the vehicle against the earth's magnetism is applied to the control unit 10.

Then, the distance sensor 4 detects the rotation of the output shaft of the speedometer cable or transmission indirectly as an electrical signal from a reed switch, a magnetically responsive element or a photoelectric converter, and applies a distance signal used for computation of the distance coverage of the vehicle to the control unit 10.

The RAM of the microcomputer 10-1 of the control unit 10, on the other hand, is provided with a video RAM (VRAM) region for directly indicating the display content of the CRT display 6. The display controller 10-2 accesses this VRAM region directly and displays the content thereof in one-to-one ratio on the CRT display 6.

The map data memory unit 5 includes an optical disc memory for storing the map data for various areas in an optical disc. The map data thus stored is read by laser beam and applied to and processed in the control unit 10.

Figure 3:
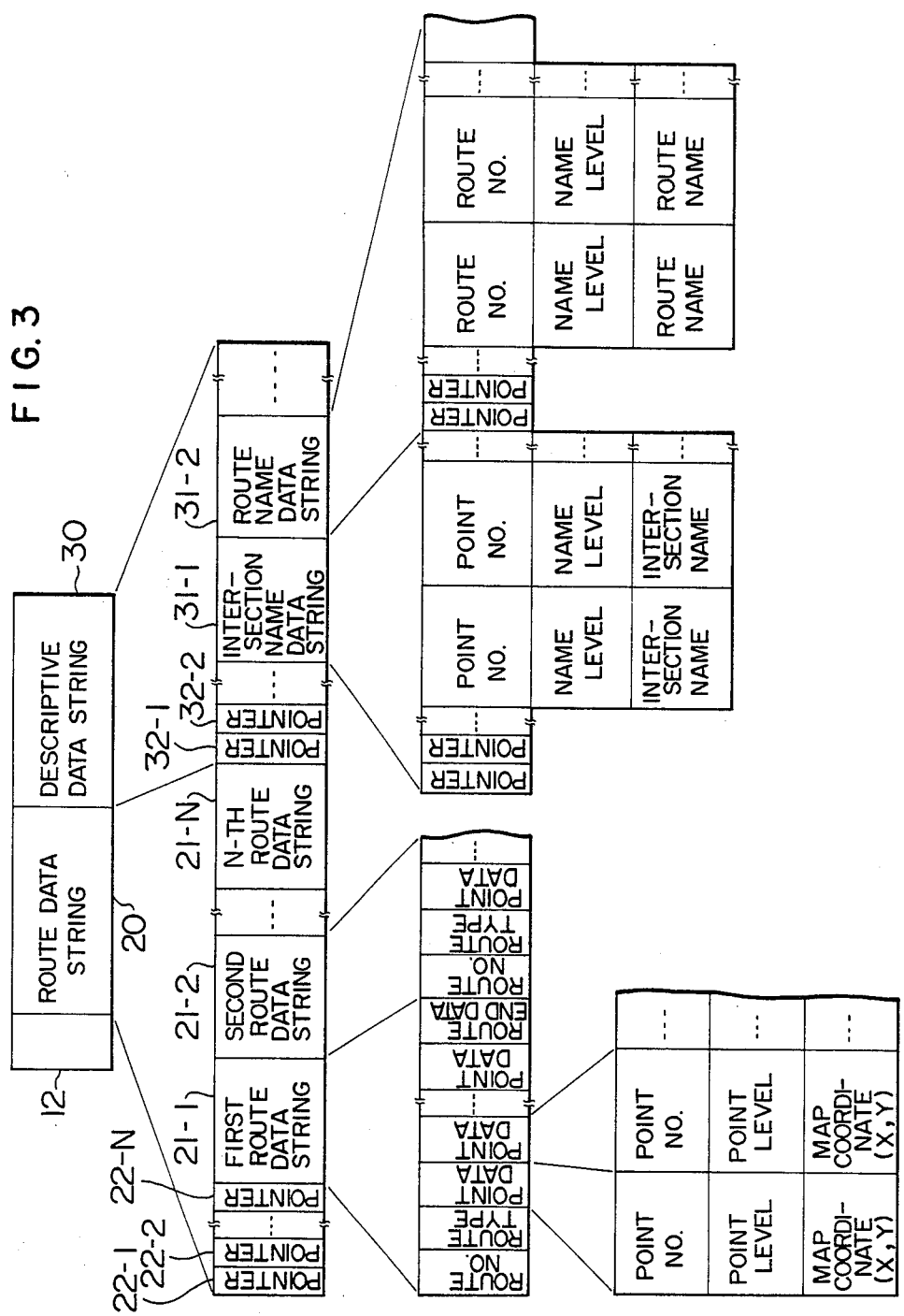
FIG. 3 is a diagram showing a construction of map data.

The data in the optical disc, as shown in FIG. 3, for instance, includes a header 12 making up an identification code of the area map data, a route data string 20 relating to various routes on the map in a particular area, and a descriptive data string 30 relating to the names of the various parts on the map.

The route data string 20 includes route data strings 21-1, 21-2, and so on for each route (linear object of display) such as a road, a river or a railway on the map, and pointers 21-1, 21-2 and so on therefor. Each of the route data strings 211, 212 and so on for each route includes the route number representing the particular route, the route type, point data relating to each point forming the route, and the route end data. Each of the point data making up the particular route also includes the point number representing the particular geographic point, the point level indicating whether or not the particular point is to be displayed on the CRT display 6 in accordance with the map scale, and the map coordinate (X, Y) indicating the position thereof. Each point on the route for which this point data is set is determined in the manner mentioned below.

Figure 4:
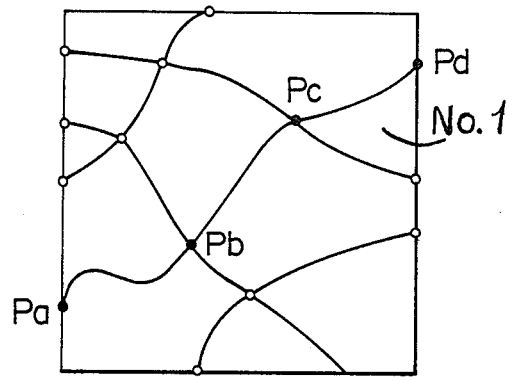
FIGS. 4 to 5 are diagrams for explaining the geographic point data.
Figure 5:
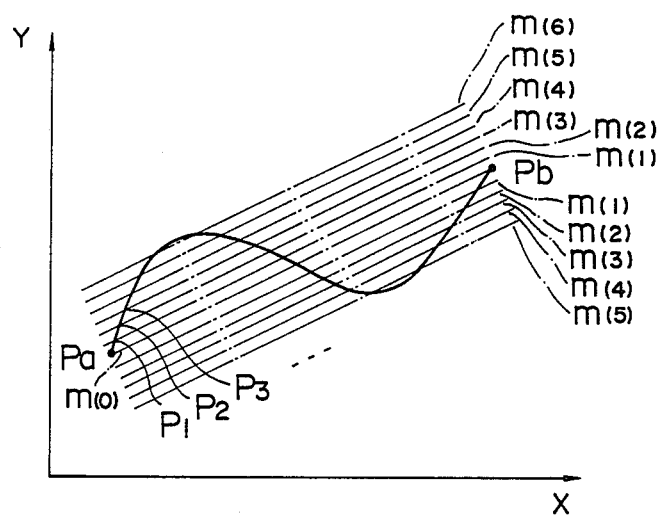

In the case where the map of the area involved is in the shape as shown in FIG. 4, for example, refer to the route data string of the route No. 1 on the map. First, the starting and terminating points of the route No. 1 and the intersections thereof with other routes are set as specific points Pa, Pb, Pc and Pd respectively making up the same route. As shown in FIG. 5, the specific points Pa, Pb, Pc and Pd (Pa and Pb in the case shown) are connected by a straight line m(0). A plurality of straight lines are drawn in parallel with this straight line m(0) at predetermined intervals. Geographic points P1, P2 and so on intersecting with these parallel lines m(1), m(2) and so on are set as point data. These points Pa, Pb, Pc, Pd and P1, P2, and so on are used as point data. These points Pa, P1,P2, . . . . . , Pb, . . . . . are stored in the route No. 1 data string 211 in that order. The point level of 0 is set for the specific points Pa, Pb, Pc and Pd, and 1, 2, 3, . . . . . for the other points corresponding to the numbers m(1), m(2), . . . . . of the parallel lines intersecting with the route respectively. By setting the point data in this way, it is often possible to indicate, in a route having a comparatively long straight line such as a road, a railway or a river, only the point data of the specific points without any point data in between, thereby reducing the amount of the map data.

Incidentally, in this embodiment, the distance between the picture elements of the most-enlarged map on the CRT display 6 is used as the interval between the parallel lines m(1), m(2) and so on corresponding to the straight line m(0). Also, the geographic coordinate (latitude, longitude) is used as the geographic coordinate (X, Y).

The descriptive data string 30, on the other hand, includes an intersection data string 31-1, route name data strings 31-2, . . . . . , and pointers 32-1, 32-2, . . . . . , corresponding one-to-one thereto. Each intersection data string 31-1 includes a plurality of intersection name data with the point number, name level and intersection name for each intersection. The route name data string 31-2 includes a plurality of route name data with the route number, name level and the route name set for each route. The name level is set to indicate whether or not the particular name is displayed in correspondence to the scale of the displayed map like the point level.

In the above-mentioned construction, the relationship between the level data in the map data on the map data memory unit 3 and the size m set by the key operation is shown in Table (A) below.

TABLE (A)

| Scale | 1/1,000,000 | 1/500,000 | 1/200,000 | 1/100,000 | 1/50,000 | 1/25,000 |
|---|---|---|---|---|---|---|
| Size S | 0 | 5 | 4 | 3 | 2 | 1 |
| Displayable level | 0 | 0 and multiples of 5 | 0 and multiples of 4 | 0 and multiples of 3 | 0 and multiples of 2 | 0 and multiples of 1 |

Figure 6A:
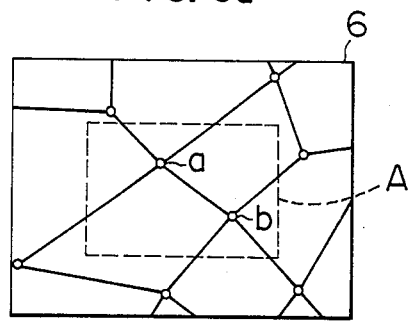
FIGS. 6a to 6c are diagrams for explaining the change of display form with enlargement or reduction of the map.
Figure 6B:
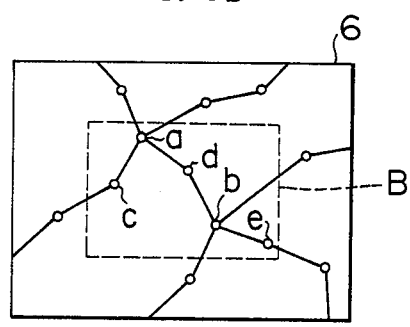
Figure 6C:
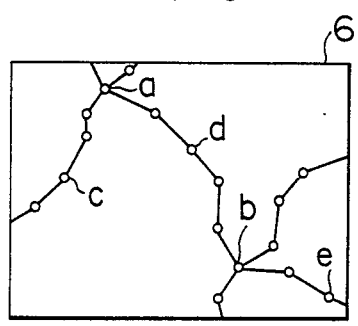

Specifically, when a size 0 corresponding to the the scale of one millionth is set, only the routes and the points assigned with 0 as level data are selected as objects to be displayed on the CRT display 5. If the size 1 corresponding to the scale of one 500 thousandth is selected, only those routes and points assigned 0 or 1 with level data are selected as objects of display. The relationship between other sizes and display objects is also the same. An example of transfer of display from the CRT display 6 will be explained below with reference to FIGS. 6a to 6c. Assume that the enlargement of the display map is designated by the key operation of the operator or by the internal processes of the control unit 10. If a map as shown in FIG. 6a is on display, the control unit 10 executes the enlargement processing about the area A surrounded by the dashed line in FIG. 6a, so that the map on the screen of the CRT display 6 is made comparatively more detailed as shown in, say, FIG. 6b. After that, upon a designation of further enlargement, the enlargement processing about the area B surrounded by the dashed line in FIG. 6b is executed, so that a more detailed map as shown in FIG. 6c is displayed on the screen of the CRT display unit 6. By the way, the points a and b in FIG. 6a represent the same geographic points as the points a and b in FIG. 6b, while the points a to e in FIG. 6b the same geographic points as the points a to e in FIG. 6c.

In the case where the reduction of the display map is designated, on the other hand, the transfer of the display form reverse to the above-mentioned case of enlargement is followed. Specifically, the display map shown in FIG. 6c is changed to the one shown in FIG. 6b, and further to the one of FIG. 6a.

Now, the processing operation according to the present embodiment will be explained with reference to the general flowchart shown in FIG. 7. Reference will be made to the case where the enlargement is designated by the key operation of the operator.

Figure 7A:
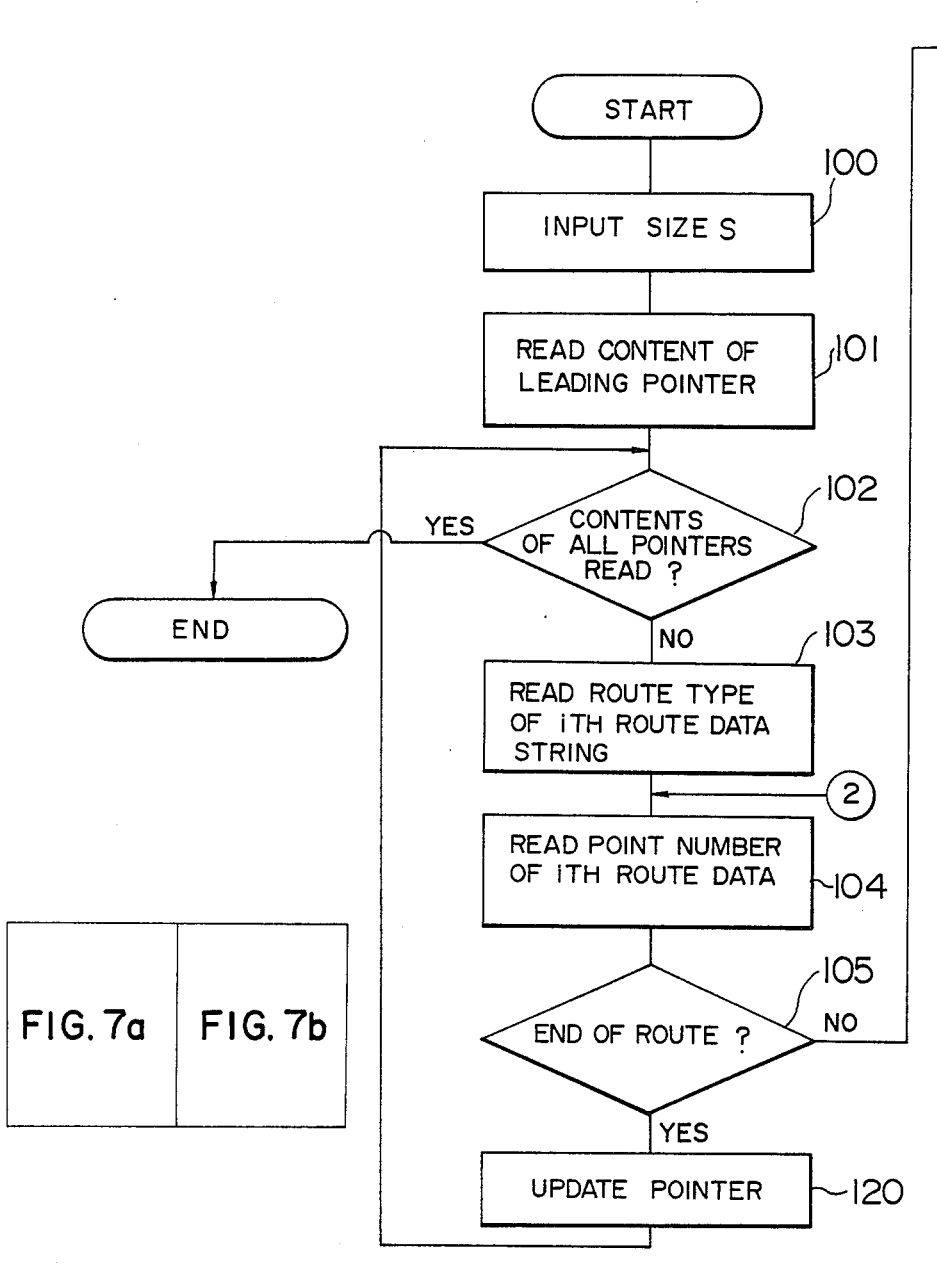
FIGS. 7a–7b are a flowchart for map display control effected by a control circuit.
Figure 7B:
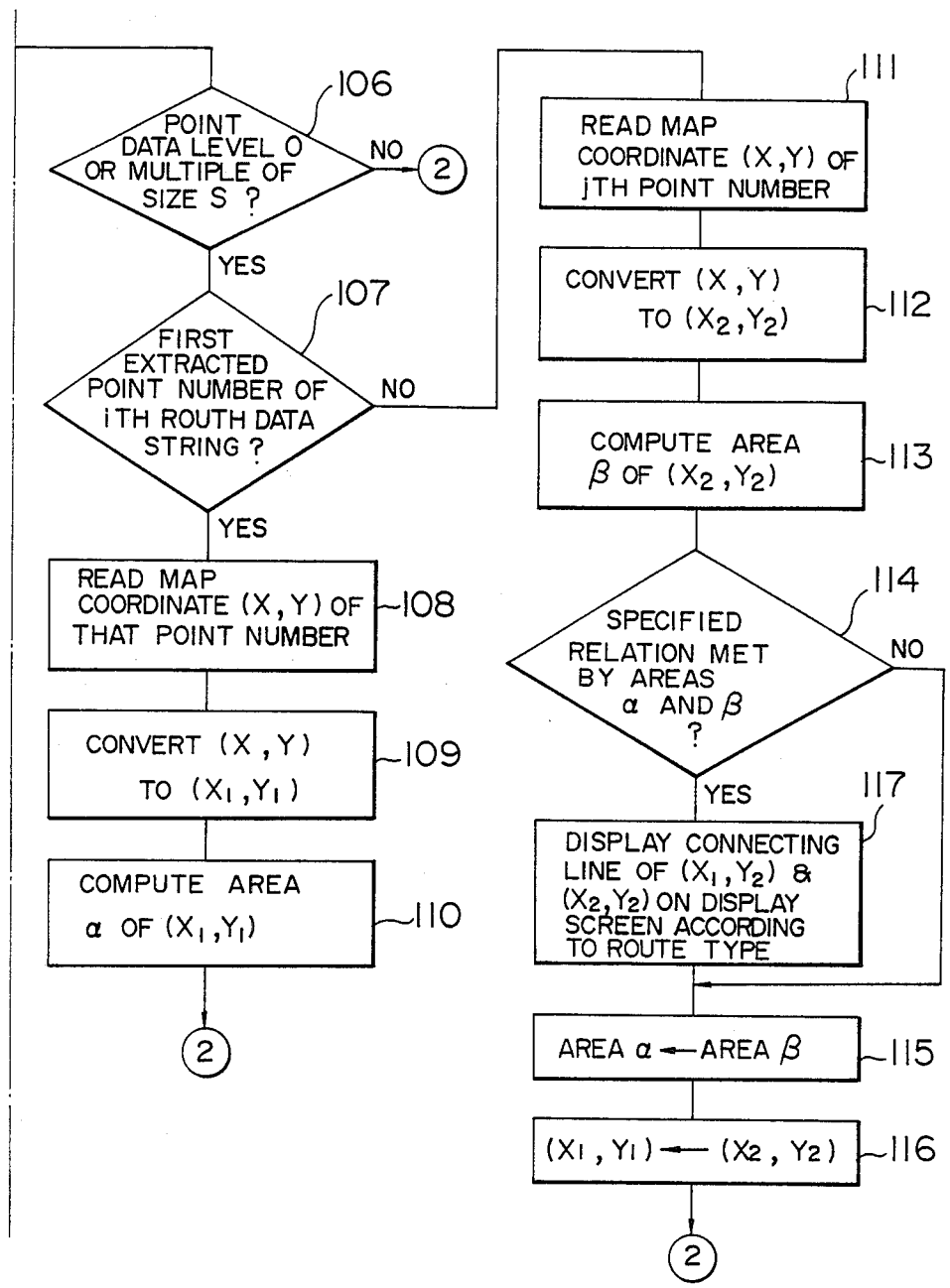

When the operator operates the enlargement key of the operating section 2, the microcomputer 101 of the control unit 10 begins the processing as shown in FIG. 7.

Specifically, the step 100 is first executed to enter the size S of the display map changed by the commanded operation of the operating section 2 . Step 101 reads the content of the leading pointer 221 in the route data string 20 of the map data memory unit 5.

The step 102 is then executed to determine whether or not the contents of the all the pointers 22-1 to 22-N have been read out.

This operation occurs immediately after the reading of the leading pointer 22-1, and therefore the decision is NO, followed by the execution of the step 103.

The step 103 reads the route type data of the route No. 1 data string (route No. 1 data string 21-1) designated by the No. 1 pointer (No. 1 pointer 22-1 at this time point) read as above. The step 104 reads the geographical point data (the leading point data at this time point) of the route No. 1 data string (route No. data string 21-1).

The process passes to the step 105 for determining whether or not the route end data of the route No. 1 data string (route No. 1 data string 21-1) has been read out.

In view of the fact that the leading point data has just been read at this time point, the decision is NO, and the next step 106 (FIG. 7b) is executed to determine whether or not the point data level of the particular point data is 0 or a multiple of the value of the size S entered at the step 100. This step is performed to determine whether or not the particular point is to be displayed in size S.

In view of the fact that this time point occurs immediately after the reading of the leading point data of the route No. 1 data string 21-1 and that the leading point data makes up the data for the specific points, that is, for the point level 0 as mentioned above, the step 106 determines that the particular point is to be displayed, followed by the step 107. The step 107 determines whether or not this point has a point number first extracted in the route No. 1 data string (route No. 1 data string 21-1).

At this time point, the first point number of the route No. 1 data string is involved, and therefore the decision is YES, followed by the steps 108, 110, so that the geographical coordinate (X, Y) of this point is read, and is converted into the display coordinate (X1, Y1). Then, the area $\alpha$ to which the display coordinate (X1, Y1) belongs is determined.

Figure 8A:
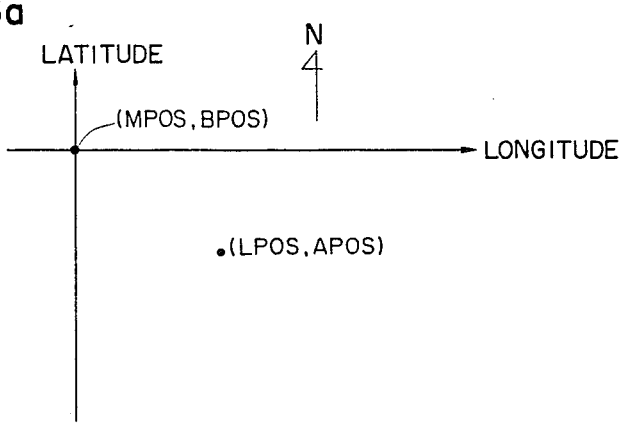
FIGS. 8a and 8b are diagrams for explaining the conversion from a map coordinate to a display coordinate.
Figure 8B:
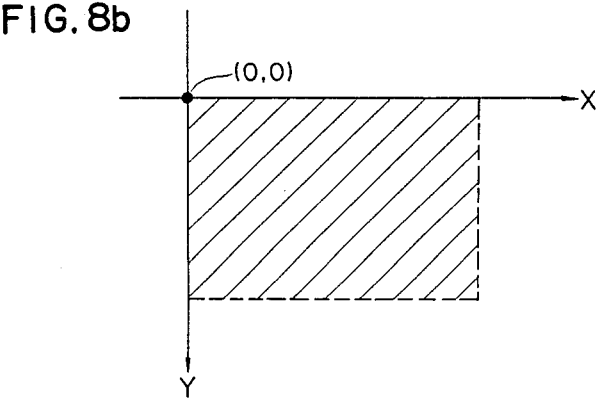

This coordinate conversion processing is such that, as shown in FIG. 8a showing the geographical coordinate system and FIG. 8b showing the display coordinate system, (1) a point (MPOS, BPOS) is obtained which corresponds to the geographical coordinates of the geographical coordinate system having one-to-one correspondence to the origin (0,0) of the hatched area of the display coordinate system (corresponding to the map display area of the display (1), and then (2) in accordance with the obtained point (MPOS, BPOS) the geographical coordinates (LPOS, APOS) of the point in question are converted to the corresponding point $(X_1, Y_1)$ of the display coordinate system.

Figure 9:
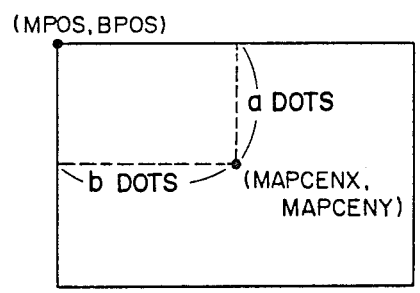
FIG. 9 is a diagram for explaining a method of determining the geographic coordinate (MPOS, BPOS) corresponding to the origin (0,0) of the map display screen.

In this case, the point (MPOS, BPOS) is obtained in the following way. Firstly, the present position of the vehicle or the center point of a display area is determined as the displayed map center coordinates (MAPCENX, MAPCENY) of the geographical coordinate system and then the point (MPOS, BPOS) is obtained from the following equations using as parameters the coordinate data MAPCENX and MAPCENY, the numbers of dots a and b of the map display screen of the CRT display 6 (FIG. 9) and the number of dots LDOT per unit longitude and the number of dots ADOT per unit latitude which are determined in accordance with the selected size S, that is, as:

$$MPOS = MAPCENX - b/LDOT$$

$$BPOS = MAPCENY + a/ADOT$$

Then, the point $(X_1, Y_1)$ is determined by the following equations $$X_1 = (LPOS - MPOS) \times LDOT$$

$$Y_1 = (BPOS - APOS) \times ADOT$$

Figures 10A, 10B:
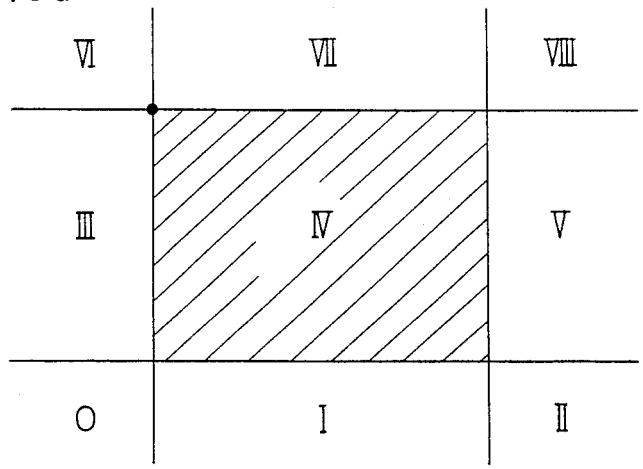
FIGS. 10a and 10b are diagrams for explaining the conditions for connection between two points on the display coordinate system.

On the other hand, the above-mentioned area determination processing is performed by determining that the display coordinate point $(X_1, Y_1)$ obtained by the previously mentioned coordinate conversion process belongs to one of the areas 0 to VIII divided as shown in FIG. 10a. In the case of FIG. 10a, the area IV corresponds to the hatched area shown in FIG. 8b or the map display area.

When the area $\alpha$ to which the display coordinate point $(X_1, Y_1)$ belongs is obtained at the step 110, a return is made to the step 104 and the next spot number of the i-th route data string (the first route data 21-1) is read out.

Then, the step 105 is performed to determine whether the route is ended. If it is not, then the step 106 is performed to determine whether the point level of this point number is a display enable level. If it is not, then a return is made to the step 104. If it is the display enable level, then the step 107 is performed to determine whether this point number is the one extracted for the first time for the i-th route data string (the first route data string 21-1).

Since the first point number has already been extracted by this time, the decision results in NO and then steps 111 to 113 are performed in this order thereby performing the similar process as the steps 108 to 110. In other words, the geographical coordinates (X, Y) of this point number (the j-th point number) are converted to the corresponding display coordinates $(X_2, Y_2)$ and an area B to which the display coordinates $(X_2, Y_2)$ belong is determined.

Then, a step 114 is performed to make a decision as to whether the connection between the point $(X_1, Y_1)$ and the point $(X_2, Y_2)$ is to be displayed, that is, whether there is a specified relation between the areas $\alpha$ and $\beta$. As will be seen from FIGS. 10a and 10b, if, for example, the display coordinates $(X_1, Y_1)$ belong to the area 0 and the other display coordinates $(X_2, Y_2)$ belong to any one of the areas 0, I, II, III and VI, the decision process determines that there is no specified relation (this is indicated by a mark X in FIG. 10b). If the display coordinates $(X_1, Y_1)$ belong to the area 0 and the other display coordinates $(X_2, Y_2)$ belong to any one of the areas IV, V, VII and VIII, then it is determined that there is the specified relation (this is indicated by a mark ○ in FIG. 10b). The decisions on the other combinations become as shown in FIG. 10b.

If there is no specified relation between the areas $\alpha$ and $\beta$, then steps 115 and 116 are performed so that an area updating process of changing the area $\alpha$ to the area $\beta$ and a coordinate updating process of changing the coordinates $(X_1, Y_1)$ to the coordinates $(X_2, Y_2)$ are performed and a return is made to the step 104.

On the other hand, if there is the specified relation, then a step 117 is performed so that the line connecting the point $(X_1, Y_1)$ and the point $(X_2, Y_2)$ is displayed on the display screen in accordance with the type of the route. In other words, if the i-th route (the first route) is a national road, the route is displayed with an increased brightness as compared with the other routes. Then, the steps 115 and 116 are performed to effect the area updating process and the coordinate updating process and a return is made to the step 104.

Thereafter, so long as the end of route is not read out, the route including the steps 104, 105 and 106 and the route including the steps 104, 105, 106, 107 and 11 to 117 (the step 117 is omitted as occasion demands) are selectively performed thus making the required route displays or the i-th route (the first route).

When the end of the route is read out for the i-th route (the first route) so that the decision of the step 105 changes to YES, the step 120 is performed and the pointer updating processing is performed. Thus, the processing for the next route (the second route) is performed in the like manner as in the case of the first route.

Thereafter, the same processing as mentioned above is successively performed for each of the route data strings so that when the processing of the Nth data string 21-N is completed, it is determined at the step 102 that the contents of all the pointers have been read out and the processing shown in FIG. 6 is ended.

A map display system used on a vehicle according to the present invention has been described above. In view of the fact that the point data making up each route is comprised of specified points intersecting with other routes and points where the particular route crosses straight lines drawn in spaced relationship and parallel therewith connecting the specified points, it is possible to considerably reduce the point data of a route (linear object of display) which has comparatively many straight parts such as a road, a river or a railway. In displaying such a route on the CRT display, or changing the scale of the map, therefore, the number of point data to be read is reduced thereby to improved the processing speed. Further, according to the present embodiment, the point level of each point data is provided by the number of the parallel lines used for setting the particular point, so that point levels can be mechanically set thereby to facilitate the preparation of map data. Furthermore, the parallel lines area set at intervals equal to the distance between the picture elements for the most-enlarged map displayed on the CRT display 6, and therefore a map can be displayed in detail in accordance with the scale thereof at the time of enlargement or reduction.

It will thus be understood from the foregoing description that according to the present invention, there is provided a map display system comprising memory means for storing a linear object of display between specified points on a map in the form of a plurality of point data including the specified points and other points on the object which intersect with straight lines drawn in spaced relationship in parallel with the straight line connecting the specified points, whereby the point data stored in the memory means for such objects of display as a road, a river or a railway which has a comparatively many straight parts are reduced, thereby shortening the time required for map display.

We claim:

1. A map display system for displaying a map in accordance with map data stored, comprising:
   memory means for storing coordinate components in a predetermined coordinate system of at least two specified points as map data, a first of said at least two specified points representing a beginning point and a second of said points representing an ending point of a predetermined section of a road on the map to be displayed, and for storing coordinate components of each of a plurality of crossing points on said predetermined section of the road, at each of which crossing points said predetermined section of the road crosses one of a plurality of parallel lines that are parallel with a straight line connecting said at least two specified points and which are spaced at equal distances from said straight line and from one another;
   display control means for converting said coordinate components of said at least two specified points and of said plurality of crossing points stored in said memory means into display coordinates and for generating a display signal for displaying a connecting line connecting said points stored in said memory on said predetermined section; and
   display means for displaying said map by displaying said connecting line of the points on said predetermined section of the road in accordance with the display signal from said display control means.

2. A map display system according to claim 1 wherein said displayed connecting line represents said road, and said at least two specified points each correspond to a particular road intersection.

3. A map display system according to claim 1 wherein each point on said predetermined section includes level data indicative of a scale to be displayed, and said system further comprises p1 instruction means for commanding a scale of the map to be displayed; and
   wherein said level data is stored in said memory means; and
   wherein said display control means includes means for reading out, from said memory means, coordinate components of a point having level data corresponding to the scale instructed by said instructing means, and
   means for converting the read out coordinate components of each point into display coordinates in accordance with the instructed scale, and generating said display signal.

4. A system as in claim 7 wherein said instruction means further comprises:
   means for determining locations of said plurality of parallel lines, and
   means for determining all of said crossing points between said predetermined section and any of said plurality of parallel lines and for storing said crossing points in said memory means.

* * * * *